US009076058B2

(12) United States Patent  (10) Patent No.: US 9,076,058 B2
Ferman  (45) Date of Patent: Jul. 7, 2015

(54) METHODS, SYSTEMS AND APPARATUS FOR DETERMINING ORIENTATION IN A DOCUMENT IMAGE

(71) Applicant: Sharp Laboratories of America, Inc., Camas, WA (US)

(72) Inventor: Ahmet Mufit Ferman, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 259 days.

(21) Appl. No.: 13/753,423

(22) Filed: Jan. 29, 2013

(65) Prior Publication Data

US 2014/0212047 A1    Jul. 31, 2014

(51) Int. Cl.
*G06K 9/46*  (2006.01)
*G06K 9/32*  (2006.01)

(52) U.S. Cl.
CPC .................................. *G06K 9/3208* (2013.01)

(58) Field of Classification Search
None
See application file for complete search history.

(56) References Cited

U.S. PATENT DOCUMENTS

| | | | |
|---|---|---|---|
| 3,831,146 A | 8/1974 | Rundle | |
| 5,020,117 A | 5/1991 | Ooi et al. | |
| 5,031,225 A | 7/1991 | Tachikawa et al. | |
| 5,060,276 A | 10/1991 | Morris et al. | |
| 5,077,811 A | 12/1991 | Onda | |
| 5,191,438 A | 3/1993 | Katsurada et al. | |
| 5,235,651 A | 8/1993 | Nafarieh | |
| 5,251,268 A | 10/1993 | Colley et al. | |
| 5,276,742 A | 1/1994 | Dasari et al. | |
| 5,319,722 A | 6/1994 | Oki et al. | |
| 5,471,549 A | 11/1995 | Kurosu et al. | |
| 5,508,810 A | 4/1996 | Sato | |
| 5,664,027 A | 9/1997 | Ittner | |
| 5,835,632 A | 11/1998 | Takasu et al. | |
| 5,854,853 A * | 12/1998 | Wang ............................ 382/176 |
| 5,889,884 A | 3/1999 | Hashimoto et al. | |
| 5,930,001 A | 7/1999 | Satoh et al. | |

(Continued)

FOREIGN PATENT DOCUMENTS

| | | | |
|---|---|---|---|
| JP | 2000-083141 A | 3/2000 |
| JP | 2002-142101 A | 5/2002 |

(Continued)

OTHER PUBLICATIONS

Chen, A knowledge-based approach for Textual Information Extraction from Mixed Text/Graphics Complex Document Images, IEEE 2010.*

*Primary Examiner* — Mark Roz
(74) *Attorney, Agent, or Firm* — Kristine Elizabeth Matthews; David C. Ripma

(57) ABSTRACT

Aspects of the present invention are related to systems, methods and apparatus for determining the orientation of a text line or a page in a document image. According to a first aspect of the present invention, an image of text blobs may be generated from a text mask associated with a document image. From the text-blob image, pixel-wise horizontal differences may be accumulated and compared to accumulated pixel-wise vertical differences. Text line orientation may be determined as horizontal when the accumulated pixel-wise horizontal differences are less than the accumulated pixel-wise vertical differences. According to a second aspect of the present invention, page orientation may be determined by reconciling an estimated text-line orientation with document language information.

20 Claims, 9 Drawing Sheets

(56) References Cited

U.S. PATENT DOCUMENTS

| | | |
|---|---|---|
| 5,987,171 A | 11/1999 | Wang |
| 6,011,877 A | 1/2000 | Ishikawa et al. |
| 6,101,270 A | 8/2000 | Takahashi |
| 6,104,832 A | 8/2000 | Saito et al. |
| 6,137,905 A | 10/2000 | Takaoka |
| 6,151,423 A | 11/2000 | Melen |
| 6,169,822 B1 | 1/2001 | Jung |
| 6,173,088 B1 | 1/2001 | Koh et al. |
| 6,266,441 B1 | 7/2001 | Hashimoto et al. |
| 6,304,681 B1 | 10/2001 | Akiba et al. |
| 6,320,983 B1 | 11/2001 | Matsuno et al. |
| 6,360,028 B1 | 3/2002 | Kaji et al. |
| 6,411,743 B1 | 6/2002 | Koh et al. |
| 6,473,196 B2 | 10/2002 | Usami et al. |
| 6,501,864 B1 | 12/2002 | Eguchi et al. |
| 6,546,215 B2 | 4/2003 | Machida |
| 6,567,628 B1 | 5/2003 | Guillemin et al. |
| 6,574,375 B1 | 6/2003 | Cullen et al. |
| 6,624,905 B1 | 9/2003 | Ikegami et al. |
| 6,798,905 B1 | 9/2004 | Sugiura et al. |
| 6,804,414 B1 | 10/2004 | Chiba et al. |
| 6,941,030 B2 | 9/2005 | Kakutani et al. |
| 6,993,205 B1 | 1/2006 | Lorie et al. |
| 7,031,553 B2 | 4/2006 | Myers et al. |
| 7,151,860 B1 | 12/2006 | Sakai et al. |
| 2001/0013938 A1 | 8/2001 | Usami et al. |
| 2001/0028737 A1 | 10/2001 | Takakura et al. |
| 2002/0126904 A1 | 9/2002 | Kakutani et al. |
| 2003/0049062 A1 | 3/2003 | Machida |
| 2003/0086721 A1 | 5/2003 | Guillemin et al. |
| 2003/0152289 A1 | 8/2003 | Luo |
| 2003/0210437 A1 | 11/2003 | Machida |
| 2004/0001606 A1 | 1/2004 | Levy |
| 2004/0179733 A1 | 9/2004 | Okubo |
| 2004/0218836 A1 | 11/2004 | Kanatsu |
| 2005/0041865 A1 | 2/2005 | Zhen et al. |
| 2005/0163399 A1 | 7/2005 | Aradhye |
| 2006/0018544 A1 | 1/2006 | Ohguro |
| 2006/0033967 A1 | 2/2006 | Brunner |
| 2006/0210195 A1 | 9/2006 | Ohguro |
| 2006/0215230 A1 | 9/2006 | Borrey et al. |
| 2008/0317341 A1* | 12/2008 | Speigle et al. ............... 382/170 |

FOREIGN PATENT DOCUMENTS

| | | |
|---|---|---|
| JP | 2008-011484 A | 1/2008 |
| JP | 2008-305099 A | 12/2008 |
| JP | 2009-105541 A | 5/2009 |

\* cited by examiner

# METHODS, SYSTEMS AND APPARATUS FOR DETERMINING ORIENTATION IN A DOCUMENT IMAGE

FIELD OF THE INVENTION

Embodiments of the present invention relate generally to methods, systems and apparatus for document processing and, in particular, to methods, systems and apparatus for determining the orientation of a text line or a page in a document image.

BACKGROUND

Orientation detection may be an important pre-processing step in a document workflow. An image of a document may be captured at an orientation other than the nominal reading position, and the captured document image may require rotation prior to subsequent processing and/or prior to presentation for content consumption. Computationally fast and efficient methods and systems for orientation detection that do not require complicated and memory-intensive processing methods may be desirable.

SUMMARY

Embodiments of the present invention comprise methods, systems and apparatus for determining the orientation of a text line or a page in a document image.

According to a first aspect of the present invention, an image of text blobs may be generated from a text mask associated with a document image. From the text-blob image, pixel-wise horizontal differences may be accumulated and compared to accumulated pixel-wise vertical differences. Text line orientation may be determined as horizontal when the accumulated pixel-wise horizontal differences are less than the accumulated pixel-wise vertical differences.

According to a second aspect of the present invention, a text mask may be generated from an input document image.

According to a third aspect of the present invention, an image of text blobs may be generated from a down-sampled version of a text mask associated with a document image. From the text-blob image, pixel-wise horizontal differences may be accumulated and compared to accumulated pixel-wise vertical differences. Text line orientation may be determined as horizontal when the accumulated pixel-wise horizontal differences are less than the accumulated pixel-wise vertical differences.

According to a fourth aspect of the present invention, page orientation may be determined by reconciling an estimated text-line orientation with document language information.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 1 is a chart showing exemplary embodiments of the present invention comprising comparing accumulated pixel-wise vertical differences and accumulated pixel-wise horizontal differences to determine text-line orientation, in a document image, from a received text mask associated with the document image;

FIG. 2 is a chart showing exemplary embodiments of the present invention comprising comparing accumulated pixel-wise vertical differences and accumulated pixel-wise horizontal differences to determine text-line orientation, in a document image, from a received text mask associated with the document image, and wherein, a horizontal text line may be determined when the accumulated pixel-wise horizontal differences is less than the accumulated pixel-wise vertical differences;

FIG. 3 is a chart showing exemplary embodiments of the present invention comprising comparing accumulated pixel-wise vertical differences and accumulated pixel-wise horizontal differences to determine text-line orientation, in a document image, from a down-sampled version of a received text mask associated with the document image;

FIG. 4 is a chart showing exemplary embodiments of the present invention comprising comparing accumulated pixel-wise vertical differences and accumulated pixel-wise horizontal differences to determine text-line orientation, in a document image, from a down-sampled version of a received text mask associated with the document image, and wherein, a horizontal text line may be determined when the accumulated pixel-wise horizontal differences is less than the accumulated pixel-wise vertical differences;

FIG. 5 is a chart showing exemplary embodiments of the present invention comprising comparing accumulated pixel-wise vertical differences and accumulated pixel-wise horizontal differences to determine text-line orientation, in a document image, from a received image and a text mask generated from the received image;

FIG. 6 is a chart showing exemplary embodiments of the present invention comprising comparing accumulated pixel-wise vertical differences and accumulated pixel-wise horizontal differences to determine text-line orientation, in a document image, from a received image and a text mask generated from the received image, and wherein, a horizontal text line may be determined when the accumulated pixel-wise horizontal differences is less than the accumulated pixel-wise vertical differences;

FIG. 7 is a picture illustrating exemplary embodiments of the present invention comprising a comparator for comparing accumulated pixel-wise vertical differences and accumulated pixel-wise horizontal differences to determine text-line orientation, in a document image, from a received image and a text mask generated from the received image or from a received text mask associated with a document image;

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods, systems and apparatus of the present invention is not intended to limit the scope of the invention, but it is merely representative of the presently preferred embodiments of the invention.

Elements of embodiments of the present invention may be embodied in hardware, firmware and/or a non-transitory computer program product comprising a computer-readable storage medium having instructions stored thereon/in which may be used to program a computing system. While exemplary embodiments revealed herein may only describe one of these forms, it is to be understood that one skilled in the art would be able to effectuate these elements in any of these forms while resting within the scope of the present invention.

Although the charts and diagrams in the figures may show a specific order of execution, it is understood that the order of execution may differ from that which is depicted. For example, the order of execution of the blocks may be changed relative to the shown order. Also, as a further example, two or more blocks shown in succession in a figure may be executed concurrently, or with partial concurrence. It is understood by those with ordinary skill in the art that a non-transitory computer program product comprising a computer-readable storage medium having instructions stored thereon/in which may be used to program a computing system, hardware and/or firmware may be created by one of ordinary skill in the art to carry out the various logical functions described herein.

Orientation detection may be an important pre-processing step in a document workflow. An image of a document may be captured at an orientation other than the nominal reading position, and the captured document image may require rotation prior to subsequent processing and/or prior to presentation for content consumption. Computationally fast and efficient methods and systems for orientation detection that do not require complicated and memory-intensive processing methods may be desirable.

Figure 1:
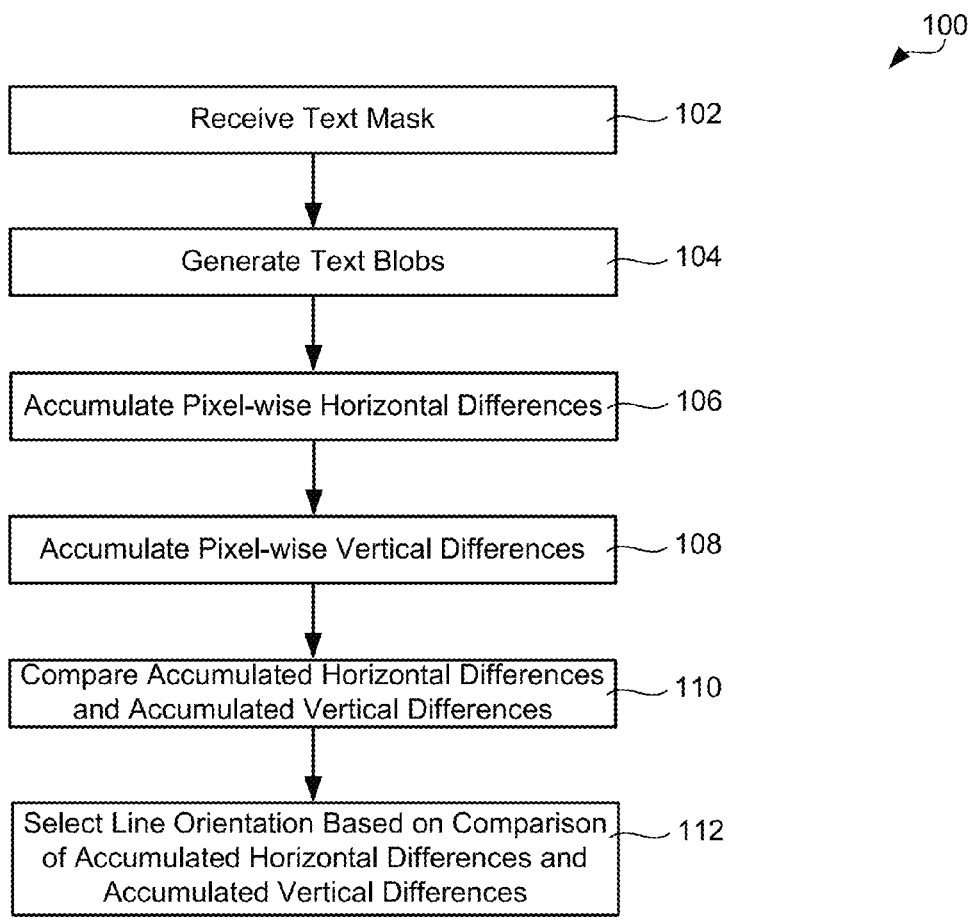

Some embodiments of the present invention may be described in relation to FIG. 1. FIG. 1 illustrates exemplary method(s) 100 for determining the line orientation in a document image. The document image may be an image generated by scanning a document page, a camera-captured image of a document page or another digital image of a document page.

A text mask associated with a document image may be received 102 in a document processing system comprising a processor. The text mask comprises a binary image, wherein one of the binary values ("one" or "zero") corresponds to pixels that may be considered a portion of a text component in the document image and the other of the binary values corresponds to pixels that may not be considered a portion of a text component in the document image. In some embodiments of the present invention, the resolution of the text mask may be the same as the resolution of a captured document image. In alternative embodiments of the present invention, the resolution of the text mask may be less than the resolution of the captured document image.

From the text mask, text blobs may be generated 104, wherein neighboring text characters in a text line may be merged into one, or more, text blobs, thereby generating a text-blob image.

In some embodiments of the present invention, text-blob generation, also considered text-blob image generation, may comprise morphological processing methods. In some of these embodiments, a dilation operation may be applied to the text mask, and a hole filling operation may be applied to the results of the dilation operation. In alternative embodiments, morphological closing, comprising a dilation operation followed by an erosion operation using the same structuring element, may be used to connect neighboring text characters in a text line. The closing operation may create text blobs that cover words and/or entire text lines, but may produce a relatively small number of cross-line merges.

In still alternative embodiments, a smearing operation may be used to merge text line components. In the smearing operation, the distance between successive text pixels along a row, and a column, may be computed. When the distance between successive text pixels is less than a predetermined threshold, all non-text pixels between the successive text pixels may be set to the binary value associated with text pixels. In some embodiments of the present invention, the predetermined threshold for row processing may be the same as the predetermined threshold for column processing. In some embodiments of the present invention, the predetermined threshold for row processing may be different than the predetermined threshold for column processing. In some embodiments of the present invention, a predetermined threshold value of 10 may be used for the row processing, and a predetermined threshold value of 3 may be used for column processing. In some embodiments of the present invention, the predetermined threshold values may be related to the expected language family of the document.

Pixel-wise horizontal differences may be accumulated 106 and pixel-wise vertical differences may be accumulated 108 from the text-blob image.

In some embodiments of the present invention the accumulated pixel-wise horizontal differences may be determined according to:

$$\Delta H = \sum_{x,y} |M_{TextBlob}(x, y) - M_{TextBlob}(x-1, y)|,$$

where $\Delta H$ may denote the accumulated pixel-wise horizontal differences, x may denote the horizontal pixel-location index, y may denote the vertical pixel-location index, $$\sum_{x,y}$$

may denote the summation over valid pixel locations, for example, pixel locations on the left vertical edge of the image may be excluded from the accumulation due to the non-existence of a horizontal left-neighboring pixel, and |•| may denote absolute value.

In some embodiments of the present invention the accumulated pixel-wise vertical differences may be determined according to:

$$\Delta V = \sum_{x,y} |M_{TextBlob}(x, y) - M_{TextBlob}(x, y-1)|,$$

where $\Delta V$ may denote the accumulated pixel-wise vertical differences, x may denote the horizontal pixel-location index, y may denote the vertical pixel-location index, $$\sum_{x,y}$$

may denote the summation over valid pixel locations, for example, pixel locations on the top horizontal edge of the image may be excluded from the accumulation due to the non-existence of a vertical top-neighboring pixel, and |•| may denote absolute value.

In some embodiments of the present invention the accumulated pixel-wise horizontal differences may be determined according to:

$$\Delta H = \sum_{x,y} M_{TextBlob}(x, y) \oplus M_{TextBlob}(x-1, y),$$

where $\oplus$ may denote a logical exclusive-OR operation.

In some embodiments of the present invention the accumulated pixel-wise vertical differences may be determined according to:

$$\Delta V = \sum_{x,y} M_{TextBlob}(x, y) \oplus M_{TextBlob}(x, y-1),$$

where $\oplus$ may denote a logical exclusive-OR operation.

The accumulated pixel-wise horizontal differences and the accumulated pixel-wise vertical differences may be compared 110, and the line orientation may be selected 112 based on the comparison of the accumulated pixel-wise horizontal differences and the accumulated pixel-wise vertical differences.

Figure 2:
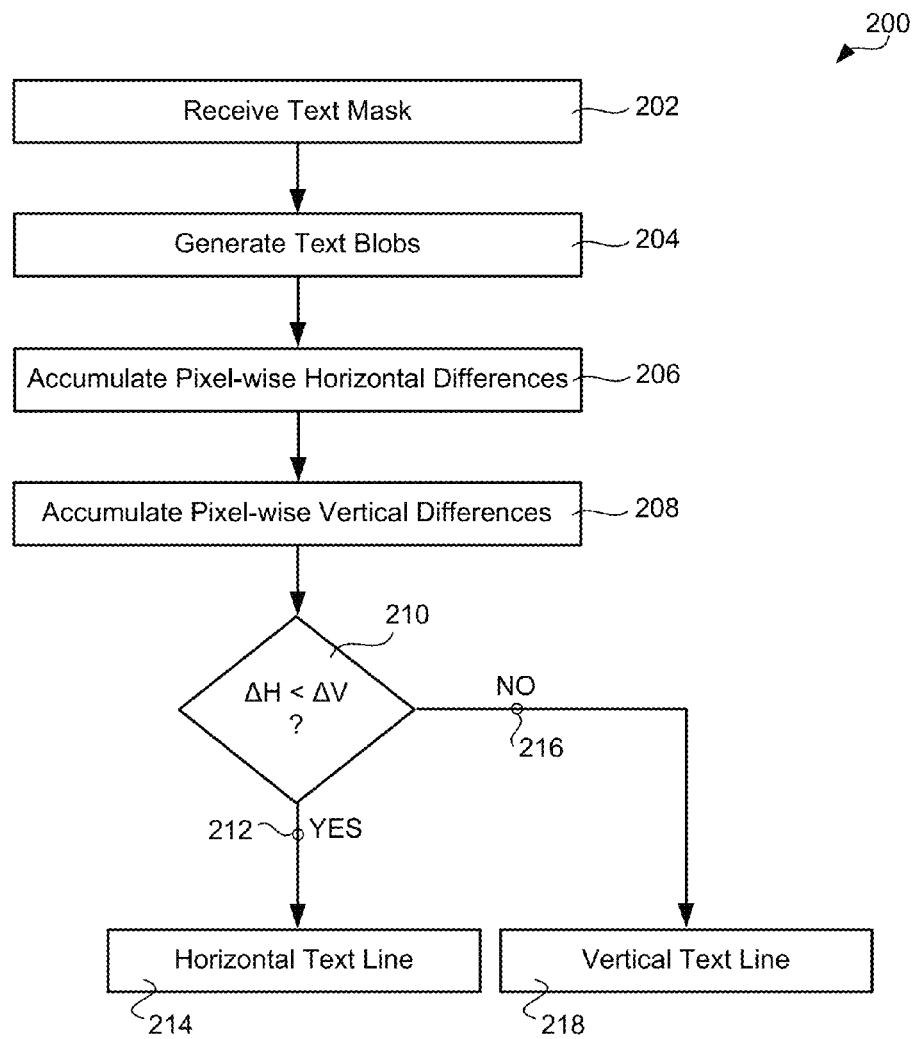

Some embodiments of the present invention may be described in relation to FIG. 2. FIG. 2 illustrates exemplary method(s) 200 for determining the line orientation in a document image. The document image may be an image generated by scanning a document page, a camera-captured image of a document page or another digital image of a document page.

A text mask associated with a document image may be received 202 in a document processing system comprising a processor. The text mask comprises a binary image, wherein one of the binary values ("one" or "zero") corresponds to pixels that may be considered a portion of a text component in the document image and the other of the binary values corresponds to pixels that may not be considered a portion of a text component in the document image. In some embodiments of the present invention, the resolution of the text mask may be the same as the resolution of a captured document image. In alternative embodiments of the present invention, the resolution of the text mask may be less than the resolution of the captured document image.

From the text mask, text blobs may be generated 204, wherein neighboring text characters in a text line may be merged into one, or more, text blobs, thereby generating a text-blob image.

In some embodiments of the present invention, text-blob generation, also considered text-blob image generation, may comprise morphological processing methods. In some of these embodiments, a dilation operation may be applied to the text mask, and a hole filling operation may be applied to the results of the dilation operation. In alternative embodiments, morphological closing, comprising a dilation operation followed by an erosion operation using the same structuring element, may be used to connect neighboring text characters in a text line. The closing operation may create text blobs that cover words and/or entire text lines, but may produce a relatively small number of cross-line merges.

In still alternative embodiments, a smearing operation may be used to merge text line components. In the smearing operation the distance between successive text pixels along a row, and a column, may be computed. When the distance between successive text pixels is less than a predetermined threshold, all non-text pixels between the successive text pixels are set to the binary value associated with text pixels. In some embodiments of the present invention, the predetermined threshold for row processing may be the same as the predetermined threshold for column processing. In some embodiments of the present invention, the predetermined threshold for row processing may be different than the predetermined threshold for column processing. In some embodiments of the present invention, a predetermined threshold value of 10 may be used for the row processing, and a predetermined threshold value of 3 may be used for column processing. In some embodiments of the present invention, the predetermined threshold values may be related to the expected language family of the document.

Pixel-wise horizontal differences may be accumulated 206 and pixel-wise vertical differences may be accumulated 208 from the text-blob image.

In some embodiments of the present invention the accumulated pixel-wise horizontal differences may be determined according to:

$$\Delta H = \sum_{x,y} |M_{TextBlob}(x, y) - M_{TextBlob}(x-1, y)|,$$

where $\Delta H$ may denote the accumulated pixel-wise horizontal differences, x may denote the horizontal pixel-location index, y may denote the vertical pixel-location index, $$\sum_{x,y}$$

may denote the summation over valid pixel locations, for example, pixel locations on the left vertical edge of the image may be excluded from the accumulation due to the non-existence of a horizontal left-neighboring pixel, and |•| may denote absolute value.

In some embodiments of the present invention the accumulated pixel-wise vertical differences may be determined according to:

$$\Delta V = \sum_{x,y} |M_{TextBlob}(x, y) - M_{TextBlob}(x, y-1)|,$$

where $\Delta V$ may denote the accumulated pixel-wise vertical differences, x may denote the horizontal pixel-location index, y may denote the vertical pixel-location index, $$\sum_{x,y}$$

may denote the summation over valid pixel locations, for example, pixel locations on the top horizontal edge of the image may be excluded from the accumulation due to the non-existence of a vertical top-neighboring pixel, and |•| may denote absolute value.

In some embodiments of the present invention the accumulated pixel-wise horizontal differences may be determined according to:

$$\Delta H = \sum_{x,y} M_{TextBlob}(x, y) \oplus M_{TextBlob}(x-1, y),$$

where $\oplus$ may denote a logical exclusive-OR operation.

In some embodiments of the present invention the accumulated pixel-wise vertical differences may be determined according to:

$$\Delta V = \sum_{x,y} M_{TextBlob}(x, y) \oplus M_{TextBlob}(x, y-1),$$

where $\oplus$ may denote a logical exclusive-OR operation.

The accumulated pixel-wise horizontal differences and the accumulated pixel-wise vertical differences may be compared 210. When the accumulated pixel-wise horizontal differences is less than the accumulated pixel-wise vertical differences 212, then the text-line orientation of the document image may be classified 214 as horizontal. When the accumulated pixel-wise horizontal differences is not less than the accumulated pixel-wise vertical differences 216, then the text-line orientation of the document image may be classified 218 as vertical.

Figure 3:
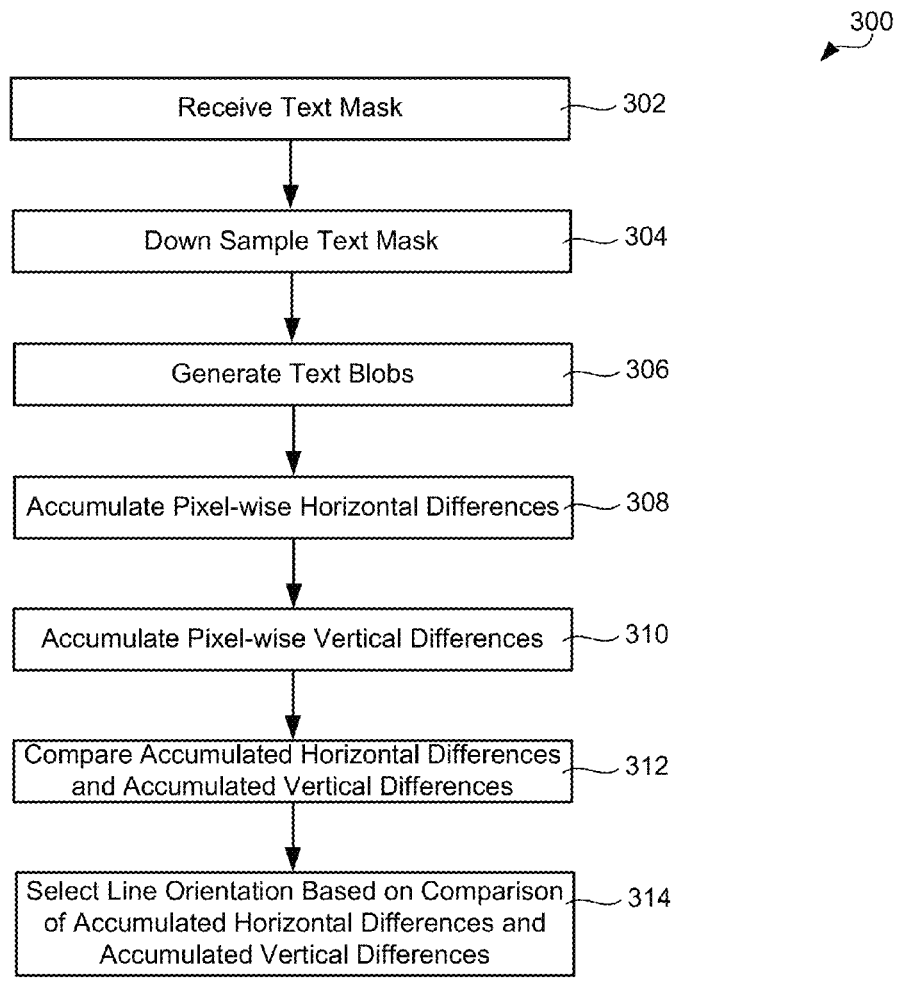

Some embodiments of the present invention may be described in relation to FIG. 3. FIG. 3 illustrates exemplary method(s) 300 for determining the line orientation in a document image. The document image may be an image generated by scanning a document page, a camera-captured image of a document page or another digital image of a document page.

A text mask associated with a document image may be received 302 in a document processing system comprising a processor. The text mask comprises a binary image, wherein one of the binary values ("one" or "zero") corresponds to pixels that may be considered a portion of a text component in the document image and the other of the binary values corresponds to pixels that may not be considered a portion of a text component in the document image.

The text mask may be down sampled 304. In some embodiments of the present invention, the down sampling may comprise nearest-neighbor interpolation to generate a lower-resolution version of the text mask. In some embodiments of the present invention, the scaling factor used in the down sampling operation may be determined according to:

$$S = \frac{640}{\max(r_i, w_i)},$$

where S may denote the scaling factor, $r_i$ and $w_i$ may denote the height and width of the input text mask, respectively, and max(•,•) may denote a maximum operation.

From the down-sampled text mask, text blobs may be generated 306, wherein neighboring text characters in a text line may be merged into one, or more, text blobs, thereby generating a text-blob image.

In some embodiments of the present invention, text-blob generation, also considered text-blob image generation, may comprise morphological processing methods. In some of these embodiments, a dilation operation may be applied to the text mask, and a hole filling operation may be applied to the results of the dilation operation. In alternative embodiments, morphological closing, comprising a dilation operation followed by an erosion operation using the same structuring element, may be used to connect neighboring text characters in a text line. The closing operation may create text blobs that cover words and/or entire text lines, but may produce a relatively small number of cross-line merges.

In still alternative embodiments, a smearing operation may be used to merge text line components. In the smearing operation the distance between successive text pixels along a row, and a column, may be computed. When the distance between successive text pixels is less than a predetermined threshold, all non-text pixels between the successive text pixels are set to the binary value associated with text pixels. In some embodiments of the present invention, the predetermined threshold for row processing may be the same as the predetermined threshold for column processing. In some embodiments of the present invention, the predetermined threshold for row processing may be different than the predetermined threshold for column processing. In some embodiments of the present invention, a predetermined threshold value of 10 may be used for the row processing, and a predetermined threshold value of 3 may be used for column processing. In some embodiments of the present invention, the predetermined threshold values may be related to the expected language family of the document.

Pixel-wise horizontal differences may be accumulated 308 and pixel-wise vertical differences may be accumulated 310 from the text-blob image.

In some embodiments of the present invention the accumulated pixel-wise horizontal differences may be determined according to:

$$\Delta H = \sum_{x,y} |M_{TextBlob}(x, y) - M_{TextBlob}(x-1, y)|,$$

where $\Delta H$ may denote the accumulated pixel-wise horizontal differences, x may denote the horizontal pixel-location index, y may denote the vertical pixel-location index, $$\sum_{x,y}$$

may denote the summation over valid pixel locations, for example, pixel locations on the left vertical edge of the image may be excluded from the accumulation due to the non-existence of a horizontal left-neighboring pixel, and |•| may denote absolute value.

In some embodiments of the present invention the accumulated pixel-wise vertical differences may be determined according to:

$$\Delta V = \sum_{x,y} |M_{TextBlob}(x, y) - M_{TextBlob}(x, y-1)|,$$

where $\Delta V$ may denote the accumulated pixel-wise vertical differences, x may denote the horizontal pixel-location index, y may denote the vertical pixel-location index, $$\sum_{x,y}$$

may denote the summation over valid pixel locations, for example, pixel locations on the top horizontal edge of the image may be excluded from the accumulation due to the non-existence of a vertical top-neighboring pixel, and |•| may denote absolute value.

In some embodiments of the present invention the accumulated pixel-wise horizontal differences may be determined according to:

$$\Delta H = \sum_{x,y} M_{TextBlob}(x, y) \oplus M_{TextBlob}(x-1, y),$$

where $\oplus$ may denote a logical exclusive-OR operation.

In some embodiments of the present invention the accumulated pixel-wise vertical differences may be determined according to:

$$\Delta V = \sum_{x,y} M_{TextBlob}(x, y) \oplus M_{TextBlob}(x, y-1),$$

where $\oplus$ may denote a logical exclusive-OR operation.

The accumulated pixel-wise horizontal differences and the accumulated pixel-wise vertical differences may be compared 312, and the line orientation may be selected 314 based on the comparison of the accumulated pixel-wise horizontal differences and the accumulated pixel-wise vertical differences.

Figure 4:
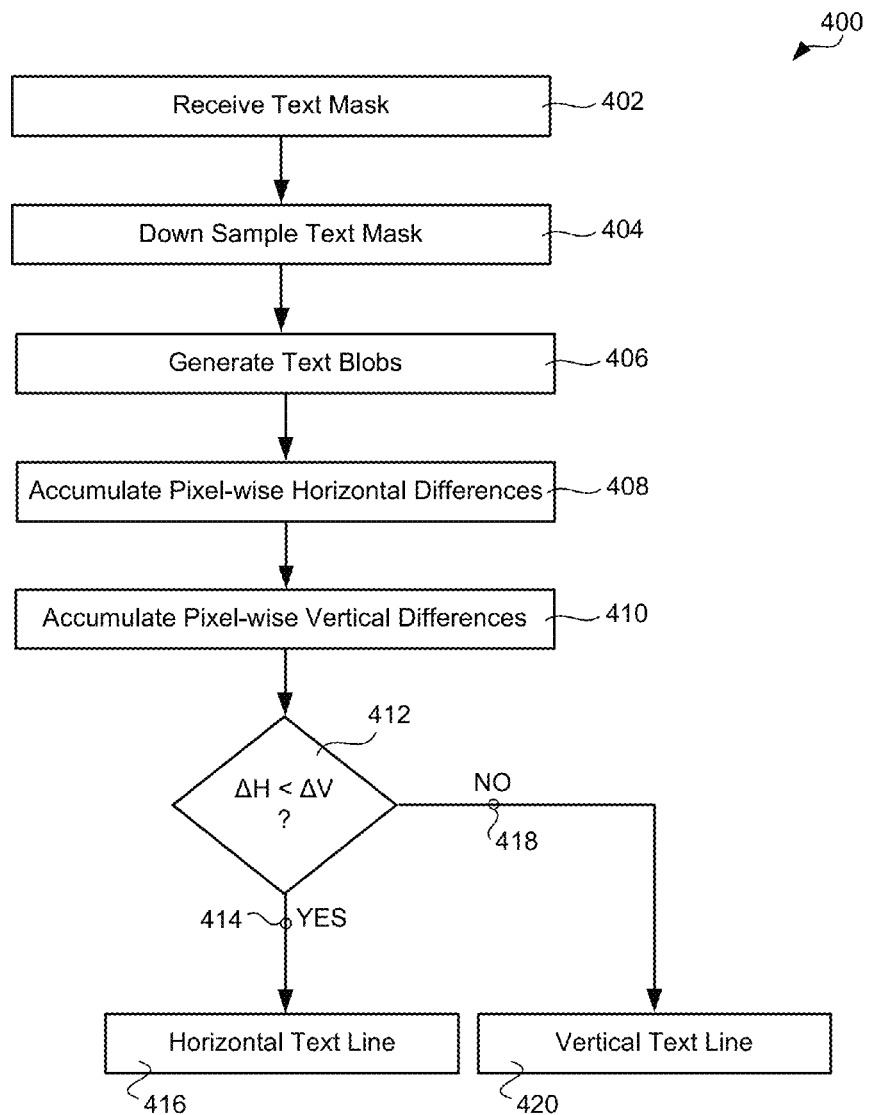

Some embodiments of the present invention may be described in relation to FIG. 4. FIG. 4 illustrates exemplary method(s) 400 for determining the line orientation in a document image. The document image may be an image generated by scanning a document page, a camera-captured image of a document page or another digital image of a document page.

A text mask associated with a document image may be received 402 in a document processing system comprising a processor. The text mask comprises a binary image, wherein one of the binary values ("one" or "zero") corresponds to pixels that may be considered a portion of a text component in the document image and the other of the binary values corresponds to pixels that may not be considered a portion of a text component in the document image.

The text mask may be down sampled 404. In some embodiments of the present invention, the down sampling may comprise nearest-neighbor interpolation to generate a lower-resolution version of the text mask. In some embodiments of the present invention, the scaling factor used in the down sampling operation may be determined according to:

$$S = \frac{640}{\max(r_i, w_i)},$$

where S may denote the scaling factor, $r_i$ and $w_i$ may denote the height and width of the input text mask, respectively, and max(•,•) may denote a maximum operation.

From the down-sampled text mask, text blobs may be generated 406, wherein neighboring text characters in a text line may be merged into one, or more, text blobs, thereby generating a text-blob image.

In some embodiments of the present invention, text-blob generation, also considered text-blob image generation, may comprise morphological processing methods. In some of these embodiments, a dilation operation may be applied to the text mask, and a hole filling operation may be applied to the results of the dilation operation. In alternative embodiments, morphological closing, comprising a dilation operation followed by an erosion operation using the same structuring element, may be used to connect neighboring text characters in a text line. The closing operation may create text blobs that cover words and/or entire text lines, but may produce a relatively small number of cross-line merges.

In still alternative embodiments, a smearing operation may be used to merge text line components. In the smearing operation the distance between successive text pixels along a row, and a column, may be computed. When the distance between successive text pixels is less than a predetermined threshold, all non-text pixels between the successive text pixels are set to the binary value associated with text pixels. In some embodiments of the present invention, the predetermined threshold for row processing may be the same as the predetermined threshold for column processing. In some embodiments of the present invention, the predetermined threshold for row processing may be different than the predetermined threshold for column processing. In some embodiments of the present invention, a predetermined threshold value of 10 may be used for the row processing, and a predetermined threshold value of 3 may be used for column processing. In some embodiments of the present invention, the predetermined threshold values may be related to the expected language family of the document.

Pixel-wise horizontal differences may be accumulated 408 and pixel-wise vertical differences may be accumulated 410 from the text-blob image.

In some embodiments of the present invention the accumulated pixel-wise horizontal differences may be determined according to:

$$\Delta H = \sum_{x,y} |M_{TextBlob}(x, y) - M_{TextBlob}(x-1, y)|,$$

where $\Delta H$ may denote the accumulated pixel-wise horizontal differences, x may denote the horizontal pixel-location index, y may denote the vertical pixel-location index, $$\sum_{x,y}$$

may denote the summation over valid pixel locations, for example, pixel locations on the left vertical edge of the image may be excluded from the accumulation due to the non-existence of a horizontal left-neighboring pixel, and |•| may denote absolute value.

In some embodiments of the present invention the accumulated pixel-wise vertical differences may be determined according to:

$$\Delta V = \sum_{x,y} |M_{TextBlob}(x, y) - M_{TextBlob}(x, y-1)|,$$

where $\Delta V$ may denote the accumulated pixel-wise vertical differences, x may denote the horizontal pixel-location index, y may denote the vertical pixel-location index, $$\sum_{x,y}$$

may denote the summation over valid pixel locations, for example, pixel locations on the top horizontal edge of the image may be excluded from the accumulation due to the non-existence of a vertical top-neighboring pixel, and |•| may denote absolute value.

In some embodiments of the present invention the accumulated pixel-wise horizontal differences may be determined according to:

$$\Delta H = \sum_{x,y} M_{TextBlob}(x, y) \oplus M_{TextBlob}(x-1, y),$$

where $\oplus$ may denote a logical exclusive-OR operation.

In some embodiments of the present invention the accumulated pixel-wise vertical differences may be determined according to:

$$\Delta V = \sum_{x,y} M_{TextBlob}(x, y) \oplus M_{TextBlob}(x, y-1),$$

where $\oplus$ may denote a logical exclusive-OR operation.

The accumulated pixel-wise horizontal differences and the accumulated pixel-wise vertical differences may be compared 412. When the accumulated pixel-wise horizontal differences is less than the accumulated pixel-wise vertical differences 414, then the text-line orientation of the document image may be classified 416 as horizontal. When the accumulated pixel-wise horizontal differences is not less than the accumulated pixel-wise vertical differences 418, then the text-line orientation of the document image may be classified 420 as vertical.

Figure 5:
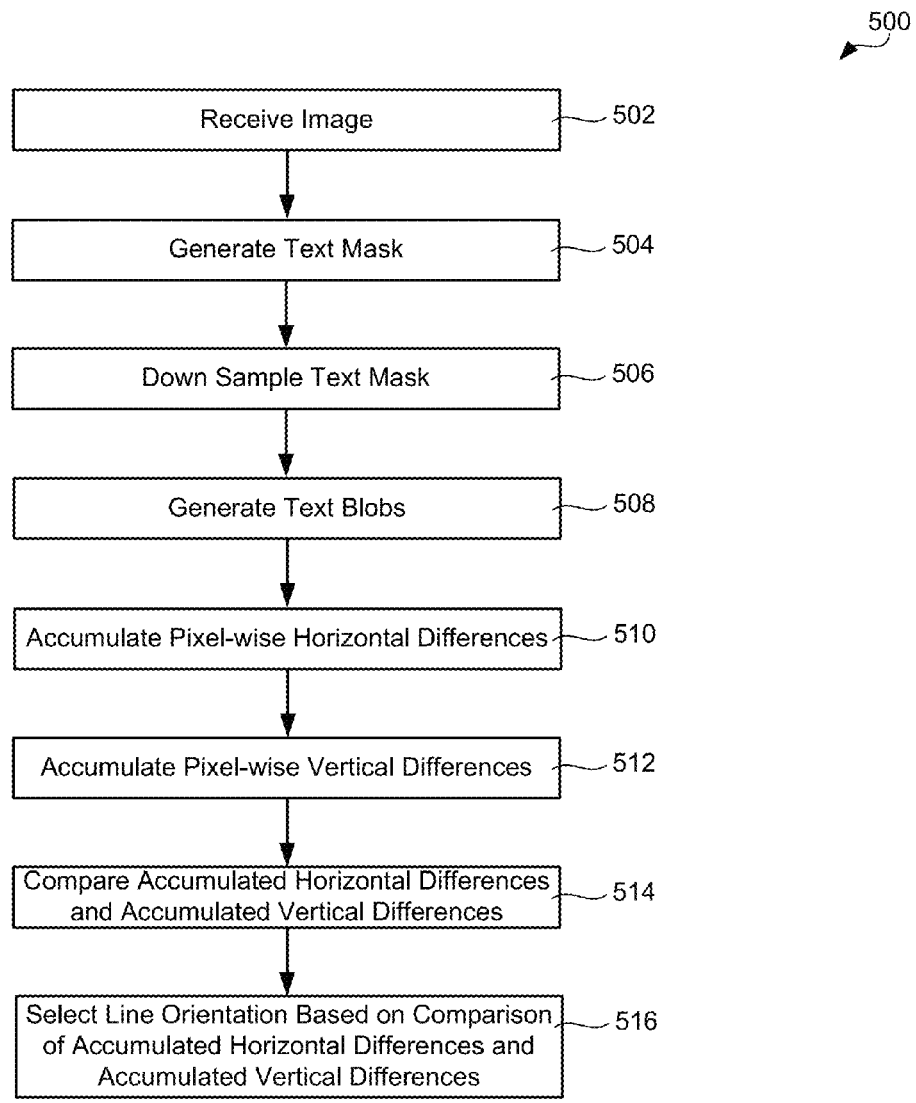

Some embodiments of the present invention may be described in relation to FIG. 5. FIG. 5 illustrates exemplary method(s) 500 for determining the line orientation in a document image.

A document image may be received 502 in a document processing system comprising a processor. The document image may be an image generated by scanning a document page, a camera-captured image of a document page or another digital image of a document page.

A text mask may be generated 504 from the document image. The text mask comprises a binary image, wherein one of the binary values ("one" or "zero") corresponds to pixels that may be considered a portion of a text component in the document image and the other of the binary values corresponds to pixels that may not be considered a portion of a text component in the document image.

In some embodiments, if the received document image is not a luminance image, a luminance-component image may be extracted, from the document image, as a first step in text-mask generation. In some embodiments, the luminance image may be generated by a color-space transformation. In alternative embodiments, one of the color components, in the received image, which closely approximates the luminance information may be selected, for example, the green component in a red-green-blue image, for the luminance image.

In some embodiments of the present invention, the text mask may be generated using a block-based adaptive thresholding technique as disclosed in U.S. Pat. No. 8,189,917, issued May 29, 2012, entitled "Methods and Systems for Locating Text in a Digital Image" invented by Richard John Campbell. U.S. Pat. No. 8,189,917 is hereby incorporated herein in its entirety.

In alternative embodiments of the present invention, other text-mask-generation methods known in the art may be used to generate the text mask.

The text mask may be down sampled 506. In some embodiments of the present invention, the down sampling may comprise nearest-neighbor interpolation to generate a lower-resolution version of the text mask. In some embodiments of the present invention, the scaling factor used in the down sampling operation may be determined according to:

$$S = \frac{640}{\max(r_i, w_i)},$$

where S may denote the scaling factor, $r_i$ and $w_i$ may denote the height and width of the input text mask, respectively, and max(•,•) may denote a maximum operation.

From the down-sampled text mask, text blobs may be generated 508, wherein neighboring text characters in a text line may be merged into one, or more, text blobs, thereby generating a text-blob image.

In some embodiments of the present invention, text-blob generation, also considered text-blob image generation, may comprise morphological processing methods. In some of these embodiments, a dilation operation may be applied to the text mask, and a hole filling operation may be applied to the results of the dilation operation. In alternative embodiments, morphological closing, comprising a dilation operation followed by an erosion operation using the same structuring element, may be used to connect neighboring text characters in a text line. The closing operation may create text blobs that cover words and/or entire text lines, but may produce a relatively small number of cross-line merges.

In still alternative embodiments, a smearing operation may be used to merge text line components. In the smearing operation the distance between successive text pixels along a row, and a column, may be computed. When the distance between successive text pixels is less than a predetermined threshold, all non-text pixels between the successive text pixels are set to the binary value associated with text pixels. In some embodiments of the present invention, the predetermined threshold for row processing may be the same as the predetermined threshold for column processing. In some embodiments of the present invention, the predetermined threshold for row processing may be different than the predetermined threshold for column processing. In some embodiments of the present invention, a predetermined threshold value of 10 may be used for the row processing, and a predetermined threshold value of 3 may be used for column processing. In some embodiments of the present invention, the predetermined threshold values may be related to the expected language family of the document.

Pixel-wise horizontal differences may be accumulated 510 and pixel-wise vertical differences may be accumulated 512 from the text-blob image.

In some embodiments of the present invention the accumulated pixel-wise horizontal differences may be determined according to:

$$\Delta H = \sum_{x,y} |M_{TextBlob}(x, y) - M_{TextBlob}(x-1, y)|,$$

where $\Delta H$ may denote the accumulated pixel-wise horizontal differences, x may denote the horizontal pixel-location index, y may denote the vertical pixel-location index, $$\sum_{x,y}$$

may denote the summation over valid pixel locations, for example, pixel locations on the left vertical edge of the image may be excluded from the accumulation due to the non-existence of a horizontal left-neighboring pixel, and |•| may denote absolute value.

In some embodiments of the present invention the accumulated pixel-wise vertical differences may be determined according to:

$$\Delta V = \sum_{x,y} |M_{TextBlob}(x, y) - M_{TextBlob}(x, y-1)|,$$

where $\Delta V$ may denote the accumulated pixel-wise vertical differences, x may denote the horizontal pixel-location index, y may denote the vertical pixel-location index, $$\sum_{x,y}$$

may denote the summation over valid pixel locations, for example, pixel locations on the top horizontal edge of the image may be excluded from the accumulation due to the non-existence of a vertical top-neighboring pixel, and |•| may denote absolute value.

In some embodiments of the present invention the accumulated pixel-wise horizontal differences may be determined according to:

$$\Delta H = \sum_{x,y} M_{TextBlob}(x, y) \oplus M_{TextBlob}(x-1, y),$$

where $\oplus$ may denote a logical exclusive-OR operation.

In some embodiments of the present invention the accumulated pixel-wise vertical differences may be determined according to:

$$\Delta V = \sum_{x,y} M_{TextBlob}(x, y) \oplus M_{TextBlob}(x, y-1),$$

where $\oplus$ may denote a logical exclusive-OR operation.

The accumulated pixel-wise horizontal differences and the accumulated pixel-wise vertical differences may be compared 514, and the line orientation may be selected 516 based on the comparison of the accumulated pixel-wise horizontal differences and the accumulated pixel-wise vertical differences.

Figure 6:
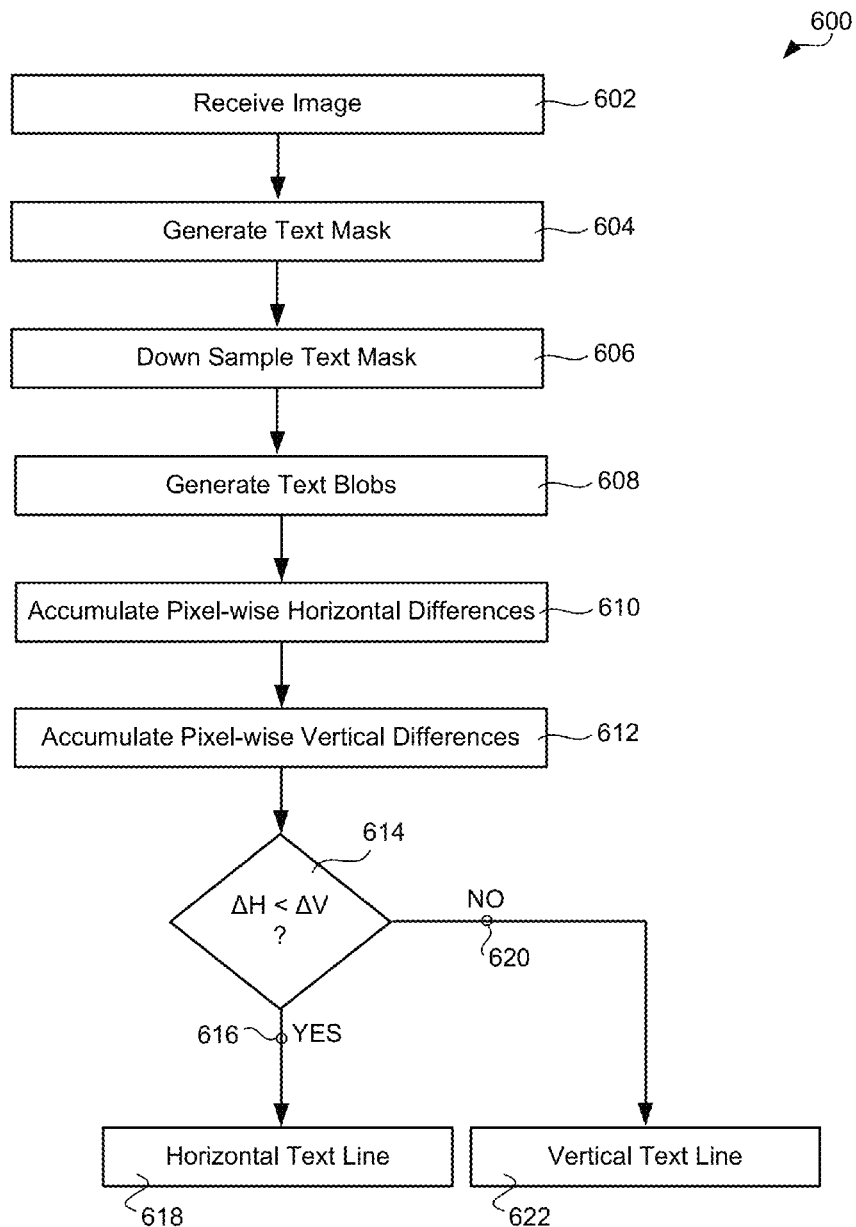

Some embodiments of the present invention may be described in relation to FIG. 6. FIG. 6 illustrates exemplary method(s) 600 for determining the line orientation in a document image.

A document image may be received 602 in a document processing system comprising a processor. The document image may be an image generated by scanning a document page, a camera-captured image of a document page or another digital image of a document page.

A text mask may be generated 604 from the document image. The text mask comprises a binary image, wherein one of the binary values ("one" or "zero") corresponds to pixels that may be considered a portion of a text component and the other of the binary values corresponds to pixels that may not be considered a portion of a text component.

In some embodiments, if the received document image is not a luminance image, a luminance-component image may be extracted, from the document image, as a first step in text-mask generation. In some embodiments, the luminance image may be generated by a color-space transformation. In alternative embodiments, one of the color components, in the received image, which closely approximates the luminance information may be selected, for example, the green component in a red-green-blue image, for the luminance image.

In some embodiments of the present invention, the text mask may be generated using a block-based adaptive thresholding technique as disclosed in U.S. Pat. No. 8,189,917, issued May 29, 2012, entitled "Methods and Systems for Locating Text in a Digital Image" invented by Richard John Campbell.

In alternative embodiments of the present invention, other text-mask-generation methods known in the art may be used to generate the text mask.

The text mask may be down sampled 606. In some embodiments of the present invention, the down sampling may comprise nearest-neighbor interpolation to generate a lower-resolution version of the text mask. In some embodiments of the present invention, the scaling factor used in the down sampling operation may be determined according to:

$$S = \frac{640}{\max(r_i, w_i)},$$

where S may denote the scaling factor, $r_i$ and $w_i$ may denote the height and width of the input text mask, respectively, and max(•,•) may denote a maximum operation.

From the down-sampled text mask, text blobs may be generated 608, wherein neighboring text characters in a text line may be merged into one, or more, text blobs, thereby generating a text-blob image.

In some embodiments of the present invention, text-blob generation, also considered text-blob image generation, may comprise morphological processing methods. In some of these embodiments, a dilation operation may be applied to the text mask, and a hole filling operation may be applied to the results of the dilation operation. In alternative embodiments, morphological closing, comprising a dilation operation followed by an erosion operation using the same structuring element, may be used to connect neighboring text characters in a text line. The closing operation may create text blobs that cover words and/or entire text lines, but may produce a relatively small number of cross-line merges.

In still alternative embodiments, a smearing operation may be used to merge text line components. In the smearing operation the distance between successive text pixels along a row, and a column, may be computed. When the distance between successive text pixels is less than a predetermined threshold, all non-text pixels between the successive text pixels are set to the binary value associated with text pixels. In some embodiments of the present invention, the predetermined threshold for row processing may be the same as the predetermined threshold for column processing. In some embodiments of the present invention, the predetermined threshold for row processing may be different than the predetermined threshold for column processing. In some embodiments of the present invention, a predetermined threshold value of 10 may be used for the row processing, and a predetermined threshold value of 3 may be used for column processing. In some embodiments of the present invention, the predetermined threshold values may be related to the expected language family of the document.

Pixel-wise horizontal differences may be accumulated 610 and pixel-wise vertical differences may be accumulated 612 from the text-blob image.

In some embodiments of the present invention the accumulated pixel-wise horizontal differences may be determined according to:

$$\Delta H = \sum_{x,y} |M_{TextBlob}(x, y) - M_{TextBlob}(x - 1, y)|,$$

where $\Delta H$ may denote the accumulated pixel-wise horizontal differences, x may denote the horizontal pixel-location index, y may denote the vertical pixel-location index, $$\sum_{x,y}$$

may denote the summation over valid pixel locations, for example, pixel locations on the left vertical edge of the image may be excluded from the accumulation due to the non-existence of a horizontal left-neighboring pixel, and |•| may denote absolute value.

In some embodiments of the present invention the accumulated pixel-wise vertical differences may be determined according to:

$$\Delta V = \sum_{x,y} |M_{TextBlob}(x, y) - M_{TextBlob}(x, y - 1)|,$$

where $\Delta V$ may denote the accumulated pixel-wise vertical differences, x may denote the horizontal pixel-location index, y may denote the vertical pixel-location index, $$\sum_{x,y}$$

may denote the summation over valid pixel locations, for example, pixel locations on the top horizontal edge of the image may be excluded from the accumulation due to the non-existence of a vertical top-neighboring pixel, and |•| may denote absolute value.

In some embodiments of the present invention the accumulated pixel-wise horizontal differences may be determined according to:

$$\Delta H = \sum_{x,y} M_{TextBlob}(x, y) \oplus M_{TextBlob}(x - 1, y),$$

where $\oplus$ may denote a logical exclusive-OR operation.

In some embodiments of the present invention the accumulated pixel-wise vertical differences may be determined according to:

$$\Delta V = \sum_{x,y} M_{TextBlob}(x, y) \oplus M_{TextBlob}(x, y - 1),$$

where $\oplus$ may denote a logical exclusive-OR operation.

The accumulated pixel-wise horizontal differences and the accumulated pixel-wise vertical differences may be compared 614. When the accumulated pixel-wise horizontal differences is less than the accumulated pixel-wise vertical differences 616, then the text-line orientation of the document image may be classified 618 as horizontal. When the accumulated pixel-wise horizontal differences is not less than the accumulated pixel-wise vertical differences 620, then the text-line orientation of the document image may be classified 622 as vertical.

Figure 7:
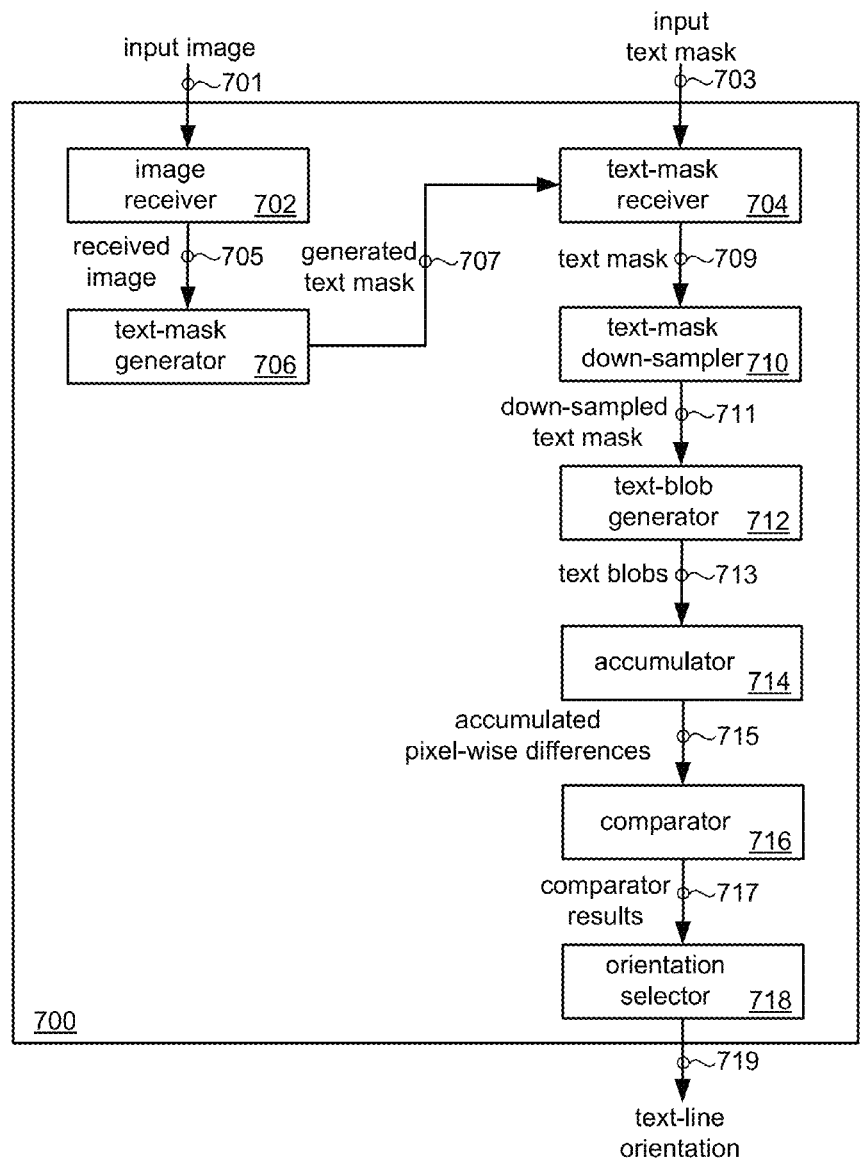

Some embodiments of the present invention may be described in relation to FIG. 7. FIG. 7 illustrates exemplary systems(s) 700 for determining the line orientation in a document image. An input image 701 may be received in the orientation-determination system 700 by an image receiver 702, or an input text mask 703 may be received in the orientation-determination system 700 by a text-mask receiver 704. The input image may be an image generated by scanning a document page, a camera-captured image of a document page or another digital image of a document page.

When an input image 701 is received in the image receiver 702, the image receiver 702 may make the received image 705 available to a text-mask generator 706. The text-mask generator 706 may extract a text mask from the received image 705.

The generated text mask 707 comprises a binary image, wherein one of the binary values ("one" or "zero") corresponds to pixels that may be considered a portion of a text component in the received image 705 and the other of the binary values corresponds to pixels that may not be considered a portion of a text component in the received image 705.

In some embodiments, if the received image 705 is not a luminance image, a luminance-component image may be extracted, from the received image 705, as a first step in text-mask generation. In some embodiments, the luminance image may be generated by a color-space transformation. In alternative embodiments, one of the color components, in the received image 705, which closely approximates the luminance information may be selected, for example, the green component in a red-green-blue image, for the luminance image.

Figure 8A:
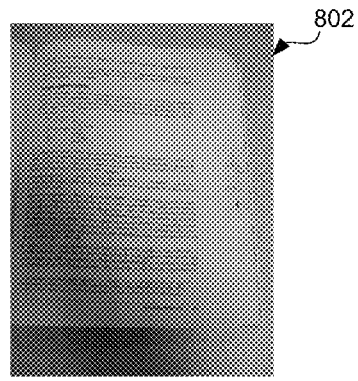
FIG. 8A is a picture depicting an exemplary input image.
Figure 8B:
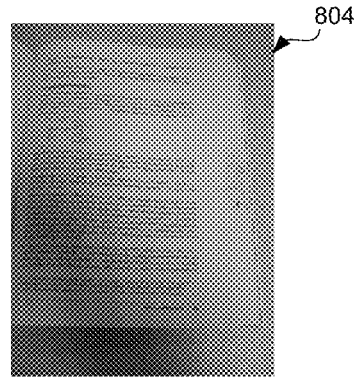
FIG. 8B is a picture depicting a luminance image generated from the exemplary input image shown in FIG. 8A.

FIG. 8A depicts an exemplary input image 802, and FIG. 8B depicts a luminance image 804 generated from the input image 802.

In some embodiments of the present invention, the text mask may be generated using a block-based adaptive thresholding technique as disclosed in U.S. Pat. No. 8,189,917, issued May 29, 2012, entitled "Methods and Systems for Locating Text in a Digital Image" invented by Richard John Campbell.

In alternative embodiments of the present invention, other text-mask-generation methods known in the art may be used to generate the text mask.

The generated text mask 707 may be received by the text-mask receiver 704.

When an input text-mask 703 is received by the text-mask receiver 704 or the generated text mask 707 is received by the text-mask receiver 704, the text-mask receiver 704 may make the text-mask 709 (either input or generated, as received) available to a text-mask down-sampler 710.

In some embodiments of the present invention, the text-mask down-sampler 710 may perform nearest-neighbor interpolation to generate a lower-resolution version 711 of the text mask 709. In some embodiments of the present invention, the scaling factor used in the down sampling operation may be determined according to:

$$S = \frac{640}{\max(r_i, w_i)},$$

where S may denote the scaling factor, $r_i$ and $w_i$ may denote the height and width of the input text mask, respectively, and max(•,•) may denote a maximum operation. A down-sampled text mask 711 may be made available to a text-blob generator 712.

Figure 8C:
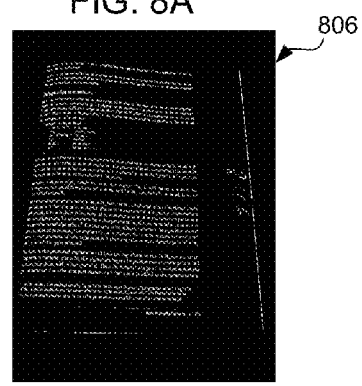
FIG. 8C is a picture depicting a text mask generated from the luminance image depicted in FIG. 8B.
Figure 8D:
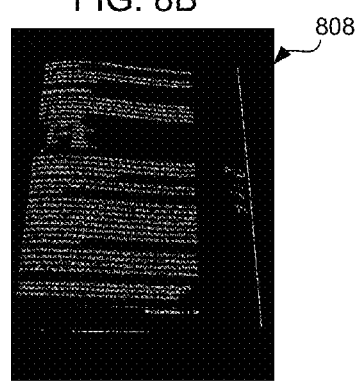
FIG. 8D is a picture showing a down-sampled version of the text mask shown in FIG. 8C.

FIG. 8C depicts a text mask 806 generated from the luminance image 804, and FIG. 8D depicts a down-sampled version 808 of the text mask 806.

From the down-sampled text mask 711, text blobs 713 may be generated, wherein neighboring text characters in a text line may be merged into one, or more, text blobs.

In some embodiments of the present invention, text-blob generation, also considered text-blob image generation, may comprise morphological processing methods. In some of these embodiments, a dilation operation may be applied to the text mask, and a hole filling operation may be applied to the results of the dilation operation.

Figure 8E:
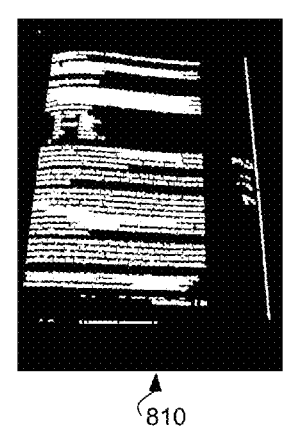
FIG. 8E is a picture depicting a text-blob image generated by applying a dilation operation to the down-sampled text mask, shown in FIG. 8D, and subsequently applying a hole filling operation to the results of the dilation operation.

FIG. 8E depicts a text-blob image 810 generated by applying a dilation operation to the down-sampled text mask 808 followed by a hole filling operation applied to the results of the dilation operation.

In alternative embodiments, morphological closing, comprising a dilation operation followed by an erosion operation using the same structuring element, may be used to connect neighboring text characters in a text line. The closing operation may create text blobs that cover words and/or entire text lines, but may produce a relatively small number of cross-line merges.

Figure 8F:
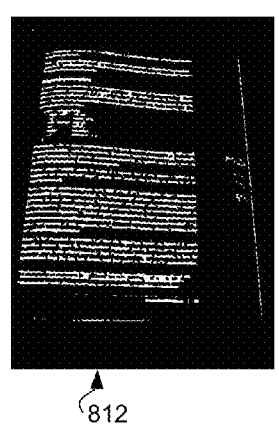
FIG. 8F is a picture depicting a text-blob image generated by applying morphological closing to the down-sampled text mask shown in FIG. 8D.

FIG. 8F depicts a text-blob image 812 generated by applying morphological closing to the down-sampled text mask 808.

In still alternative embodiments, a smearing operation may be used to merge text line components. In the smearing operation the distance between successive text pixels along a row, and a column, may be computed. When the distance between successive text pixels is less than a predetermined threshold, all non-text pixels between the successive text pixels are set to the binary value associated with text pixels. In some embodiments of the present invention, the predetermined threshold for row processing may be the same as the predetermined threshold for column processing. In some embodiments of the present invention, the predetermined threshold for row processing may be different than the predetermined threshold for column processing. In some embodiments of the present invention, a predetermined threshold value of 10 may be used for the row processing, and a predetermined threshold value of 3 may be used for column processing. In some embodiments of the present invention, the predetermined threshold values may be related to the expected language family of the document.

Figure 8G:
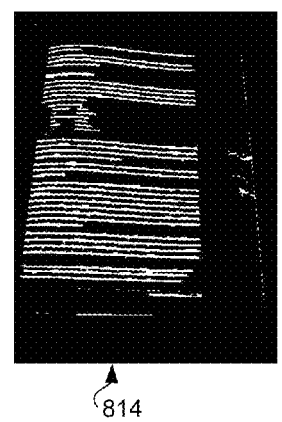
FIG. 8G is a picture depicting a text-blob image generated by applying a smearing operation to the down-sampled text mask shown in FIG. 8D.

FIG. 8G depicts a text-blob image 814 generated by applying a smearing operation to the down-sampled text mask 808.

The text blobs 713 may be made available to an accumulator 714, and pixel-wise horizontal differences may be accumulated and pixel-wise vertical differences may be accumulated from the text-blob image 713.

In some embodiments of the present invention the accumulated pixel-wise horizontal differences may be determined according to:

$$\Delta H = \sum_{x,y} |M_{TextBlob}(x, y) - M_{TextBlob}(x-1, y)|,$$

where $\Delta H$ may denote the accumulated pixel-wise horizontal differences, x may denote the horizontal pixel-location index, y may denote the vertical pixel-location index, $$\sum_{x,y}$$

may denote the summation over valid pixel locations, for example, pixel locations on the left vertical edge of the image may be excluded from the accumulation due to the non-existence of a horizontal left-neighboring pixel, and |•| may denote absolute value.

In some embodiments of the present invention the accumulated pixel-wise vertical differences may be determined according to:

$$\Delta V = \sum_{x,y} |M_{TextBlob}(x, y) - M_{TextBlob}(x, y-1)|,$$

where $\Delta V$ may denote the accumulated pixel-wise vertical differences, x may denote the horizontal pixel-location index, y may denote the vertical pixel-location index, $$\sum_{x,y}$$

may denote the summation over valid pixel locations, for example, pixel locations on the top horizontal edge of the image may be excluded from the accumulation due to the non-existence of a vertical top-neighboring pixel, and |•| may denote absolute value.

In some embodiments of the present invention the accumulated pixel-wise horizontal differences may be determined according to:

$$\Delta H = \sum_{x,y} M_{TextBlob}(x, y) \oplus M_{TextBlob}(x-1, y),$$

where ⊕ may denote a logical exclusive-OR operation.

In some embodiments of the present invention the accumulated pixel-wise vertical differences may be determined according to:

$$\Delta V = \sum_{x,y} M_{TextBlob}(x, y) \oplus M_{TextBlob}(x, y-1),$$

where ⊕ may denote a logical exclusive-OR operation.

The accumulated pixel-wise horizontal differences, horizontal and vertical, 715 may be made available to a comparator 716, wherein the accumulated pixel-wise horizontal differences and the accumulated pixel-wise vertical differences may be compared, and the comparator results 717 may be made available to an orientation selector 718. When the accumulated pixel-wise horizontal differences is less than the accumulated pixel-wise vertical differences, then the text-line orientation 719 of the document image may be classified as horizontal by the orientation selector 718. When the accumulated pixel-wise horizontal differences is not less than the accumulated pixel-wise vertical difference, then the text-line orientation 719 of the document image may be classified as vertical by the orientation selector 718.

The text-line orientation 719 may be made available by the orientation-determination system 700 to other document-processing applications in a document workflow.

Figure 9:
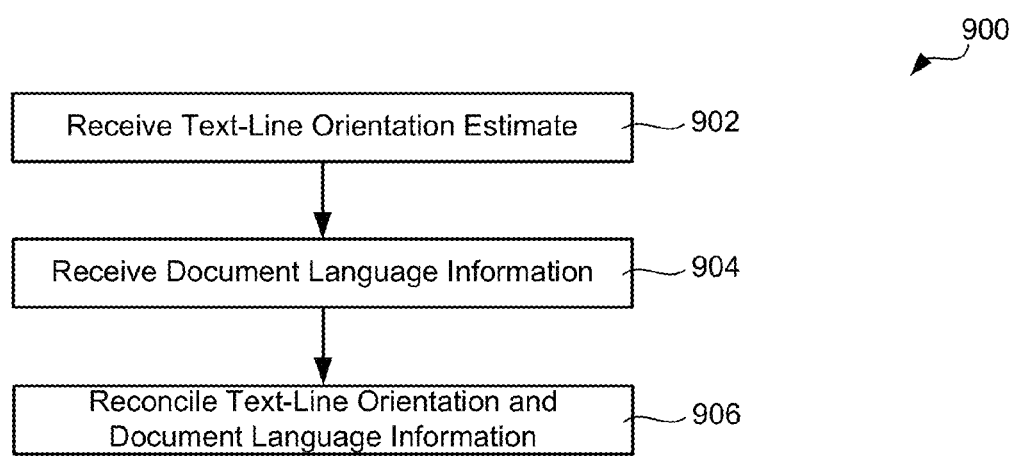
FIG. 9 is a chart showing exemplary embodiments of the present invention comprising reconciling a text-line orientation estimate with received document language information to determine page orientation.

In some embodiments of the present invention described in relation to FIG. 9, a text-line orientation estimate may be used in conjunction with document language information to identify a page orientation. FIG. 9 illustrates exemplary method(s) 900 for determining the orientation of a document image. A text-line orientation estimate may be received 902 and document language information may be received 904. The document language information may comprise an indicator of the text-line orientation for the written word in a language in a language family, for example, horizontal text-line orientation for left-to-right written languages, for example, English, and vertical text-line orientation for top-to-bottom written languages, for example, Japanese. The received text-line estimate may be reconciled 906 with the received document language information to determine the page orientation.

Some embodiments of the present invention may comprise a computer program product comprising a non-transitory computer-readable storage medium having instructions stored thereon/in which may be used to program a computing system to perform any of the features and methods described herein. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMS), Electrically Erasable Programmable Read-Only Memory (EEPROMs), Random-Access Memory (RAMS), Video Random-Access Memory (VRAMs), Dynamic Random-Access Memory (DRAMs) and any type of media or device suitable for storing instructions and/or data.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for determining a line orientation in a document image, said method comprising:
   receiving, in a processor, a text mask associated with a document image;
   generating a text-blob image from said text mask;
   accumulating pixel-wise horizontal differences of horizontally adjacent pixel intensity values in said text-blob image;
   accumulating pixel-wise vertical differences of vertically adjacent pixel intensity values in said text-blob image; and
   selecting a line orientation based on a comparison of said accumulated pixel-wise horizontal differences and said accumulated pixel-wise vertical differences.

2. A method as described in claim 1, wherein said text mask is a lower resolution than said document image.

3. A method as described in claim 1 further comprising:
   receiving said document image; and
   generating said text mask from said document image.

4. A method as described in claim 3, wherein said generating said text mask comprises:
   extracting a luminance image from said document image; and
   generating said text mask from said luminance image.

5. A method as described in claim 3, wherein said generating said text mask comprises:
   extracting a luminance image from said document image;
   generating a first text mask from said luminance image; and
   down-sampling said first text mask to form said text mask.

6. A method as described in claim 1, wherein:
   prior to said generating a text-blob image, said text mask is down-sampled; and
   said text-blob image is generated from said down-sampled text mask.

7. A method as described in claim 1, wherein said line orientation is horizontal when said accumulated pixel-wise horizontal differences is less than said accumulated pixel-wise vertical differences.

8. A method as described in claim 7, wherein said line orientation is vertical when said accumulated pixel-wise horizontal differences is not less than said accumulated pixel-wise vertical differences.

9. A method as described in claim 1, wherein said generating a text-blob image comprises an operation selected from the group consisting of a smearing operation, a morphological closing operation and a morphological operation comprising a dilation operation followed by a hole filling operation.

10. A method as described in claim 1 further comprising:
receiving document language information; and
determining a page orientation by reconciling said document language information and said line orientation.

11. A non-transitory computer-readable medium encoded with a computer program code for implementing a method for determining a line orientation in a document image, said method comprising:
receiving, in a processor, a text mask associated with a document image;
generating a text-blob image from said text mask;
accumulating pixel-wise horizontal differences of horizontally adjacent pixel intensity values in said text-blob image;
accumulating pixel-wise vertical differences of vertically adjacent pixel intensity values in said text-blob image; and
selecting a line orientation based on a comparison of said accumulated pixel-wise horizontal differences and said accumulated pixel-wise vertical differences.

12. A computer-readable medium as described in claim 11, said method further comprising:
receiving said document image; and
generating said text mask from said document image.

13. A computer-readable medium as described in claim 12, wherein, in said method, said generating said text mask comprises:
extracting a luminance image from said document image; and
generating said text mask from said luminance image.

14. A computer-readable medium as described in claim 12, wherein said generating said text mask comprises:
extracting a luminance image from said document image;
generating a first text mask from said luminance image; and
down-sampling said first text mask to form said text mask.

15. A computer-readable medium as described in claim 11, wherein, in said method:
prior to said generating a text-blob image, said text mask is down-sampled; and
said text-blob image is generated from said down-sampled text mask.

16. A computer-readable medium as described in claim 11, wherein, in said method, said line orientation is horizontal when said accumulated pixel-wise horizontal differences is less than said accumulated pixel-wise vertical differences.

17. A computer-readable medium as described in claim 16, wherein, in said method, said line orientation is vertical when said accumulated pixel-wise horizontal differences is not less than said accumulated pixel-wise vertical differences.

18. A computer-readable medium as described in claim 11, wherein, in said method, said generating a text-blob image comprises an operation selected from the group consisting of a smearing operation, a morphological closing operation and a morphological operation comprising a dilation operation followed by a hole filling operation.

19. A system for determining a line orientation in a document image, said system comprising, in a processor:
a text-mask receiver for receiving a text mask associated with a document image;
a text-blob generator for generating a text-blob image from said text mask;
an accumulator for accumulating pixel-wise horizontal differences of horizontally adjacent pixel intensity values in said text-blob image and for accumulating pixel-wise vertical differences of vertically adjacent pixel intensity values in said text-blob image;
a comparator for comparing said accumulated pixel-wise horizontal differences and said accumulated pixel-wise vertical differences; and
an orientation selector for selecting a line orientation based on said comparison of said accumulated pixel-wise horizontal differences and said accumulated pixel-wise vertical differences.

20. A method for determining a page orientation in a document image, said method comprising:
receiving, in a processor, a text mask associated with a document image;
generating a text-blob image from said text mask;
accumulating pixel-wise horizontal differences of horizontally adjacent pixel intensity values in said text-blob image;
accumulating pixel-wise vertical differences of vertically adjacent pixel intensity values in said text-blob image;
selecting a line orientation based on a comparison of said accumulated pixel-wise horizontal differences and said accumulated pixel-wise vertical differences;
receiving a document language information; and
selecting a page orientation based on said line orientation and said document language information.

* * * * *